March 14, 1939.  C. PAULSON  2,150,398
MEASURING APPARATUS
Filed Aug. 18, 1936
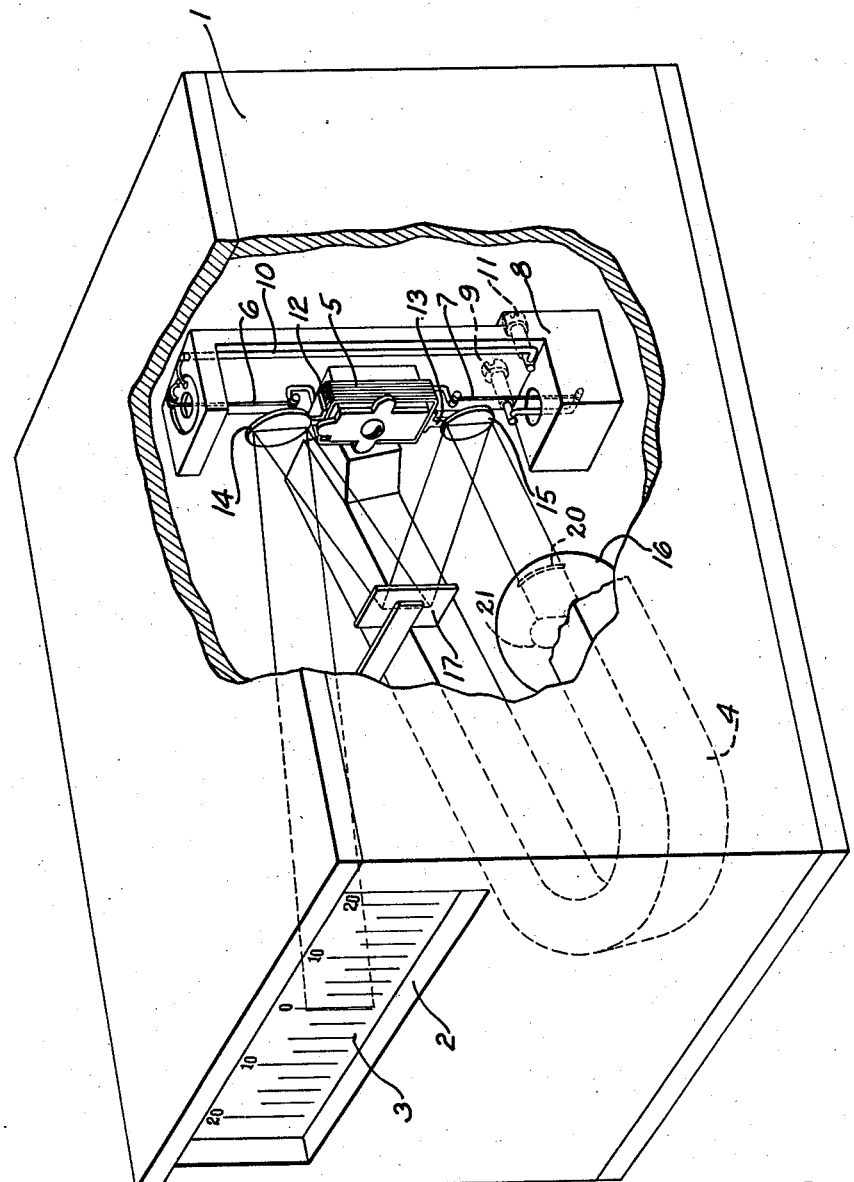
INVENTOR
C. PAULSON
BY H. A. Whitehorn
ATTORNEY Patented Mar. 14, 1939

2,150,398

UNITED STATES PATENT OFFICE 2,150,398

MEASURING APPARATUS

Christian Paulson, Elmhurst, Ill., assignor to Western Electric Company, Incorporated, New York, N. Y., a corporation of New York Application August 18, 1936, Serial No. 96,694

1 Claim. (Cl. 171—95)

This invention relates to a measuring apparatus, and more particularly to apparatus for measuring very small electrical currents.

It is an object of the present invention to provide a simple and highly sensitive measuring device.

In accordance with an embodiment of the invention as applied to galvanometers for measuring small electrical currents, the moving element of the galvanometer is equipped with a pair of mirrors, one of which reflects the image of a lamp filament onto a stationary mirror which in turn reflects the image to the second of the pair of mirrors on the movable element which will reflect the image onto a scale. Movement of the movable element will cause the reflection of the image to be deflected at progressively greater angles from one mirror to the next mirror whereby relatively small movements of the movable element will be clearly indicated by a large displacement of the image on the scale.

Other objects and advantages of the invention will more fully appear from the following detailed description taken in connection with the accompanying drawing, wherein the single figure is a perspective view of a galvanometer made in accordance with the preferred form of the invention, parts being broken away to more clearly show the apparatus.

Referring now to the drawing wherein numeral 1 indicates a box having a window 2 formed therein in which a graduated translucent scale 3 is positioned. As is usual in galvanometers, a horseshoe type magnet 4 positioned within the box has its pole pieces (one of which is broken off to more clearly show the construction of the galvanometer) adjacent a moving coil 5 which is supported by a pair of thin wires 6 and 7 connected to the moving coil and a support 8, the wire 7 is electrically connected to a terminal screw 9, and the thin wire 6 is connected by means of a wire 10 to a terminal 11. The wires 6 and 7 thus constitute a support for the moving coil 5 and tend to hold it in its normal position and to resist the turning of the coil under the influence of the current being measured, the supporting wires 6 and 7 thereby constituting torsion springs for supporting the coil in a predetermined position. The voltage to be measured by the galvanometer may be suitably applied to the terminals 9 and 11, and any current flowing will influence the coil and cause the coil to be moved in accordance with such current. A pair of brackets 12 and 13 mounted upon the coil carry small concave mirrors 14, and 15, respectively. An electric lamp 16 having a straight vertically disposed filament is mounted in the box adjacent the mirror 15 so that the image of the filament will be reflected by this mirror. The envelope of the lamp is rendered opaque in any suitable manner on all portions thereof except the portion closest to the mirror 15 where a transparent slit 20 is provided on the envelope of the lamp so that the light from the lamp will not illuminate the scale directly nor be picked up directly by concave mirror 14. The concave mirror 15 will reflect the image of the filament 21 of the lamp 16 through the slit 20 and cast a thin beam of light onto a stationary, flat mirror 17, which will in turn reflect the image onto the second concave mirror 14 and from the mirror 14 the image will be thrown on the scale 3.

It will be apparent from the foregoing that the image of the lamp filament reflected by the concave mirror 15 will be displaced along the surface of the stationary mirror 17 an amount proportionate to the angular displacement of the mirror 15 and since the angle of reflection is equal to the angle of incidence, the reflection of the image of the filament from the stationary mirror will be displaced on the concave mirror 14 transversely thereof a distance greater than but proportionate to the displacement of the image along the surface of the stationary mirror 17. The mirror 14 will, therefore, have the image of the filament thrown thereon at an angle to the plane of the rim thereof, and since the mirror 14 is angularly displaced in the same direction as the mirror 15 an amount equal to the angular displacement of the mirror 15, an angular deflection of the beam carrying the image will be increased approximately one-hundred percent as compared with a galvanometer having a single mirror. Thus a very slight angular displacement of the coil 5 will cause the image of the lamp filament to be displaced across the scales a relatively great distance.

Although the invention has been illustrated as applied to a galvanometer having two mirrors attached to the moving coil thereof, it will be understood that numerous modifications and adaptations of the apparatus could be made without departing from the scope of the invention which is to be limited only by the scope of the appended claim.

What is claimed is:

In a galvanometer, a coil movable in response to a measurement being made, a spring mounting means for normally supporting said coil in a predetermined position, a plane mirror mounted near said coil, a source of light positioned below said plane mirror and farther from said coil than the plane mirror, a concave mirror mounted on said coil for reflecting an image of said light source upon said plane mirror, a scale, and a second concave mirror mounted upon said coil for reflecting the image cast upon the plane mirror onto the scale.

CHRISTIAN PAULSON.